United States Patent
Jung

(10) Patent No.: US 9,638,218 B2
(45) Date of Patent: May 2, 2017

(54) JOYSTICK PILOT VALVE EQUIPPED WITH THE STRUCTURE FOR PREVENTING OIL LEAKAGE

(71) Applicant: JEIL PMC CO., LTD, Busan (KR)

(72) Inventor: Choon Kook Jung, Busan (KR)

(73) Assignee: JEIL PMC CO., LTD, Busan (KR)

( * ) Notice: Subject to any disclaimer, the term of this patent is extended or adjusted under 35 U.S.C. 154(b) by 0 days.

(21) Appl. No.: 14/761,752

(22) PCT Filed: Dec. 11, 2013

(86) PCT No.: PCT/KR2013/011491
§ 371 (c)(1),
(2) Date: Jul. 17, 2015

(87) PCT Pub. No.: WO2014/112719
PCT Pub. Date: Jul. 24, 2014

(65) Prior Publication Data
US 2015/0354175 A1    Dec. 10, 2015

(30) Foreign Application Priority Data
Jan. 18, 2013 (KR) .......... 10-2013-0005944
Apr. 9, 2013 (KR) .......... 10-2013-0038568

(51) Int. Cl.
E02F 9/22 (2006.01)
E02F 9/20 (2006.01)
(Continued)

(52) U.S. Cl.
CPC ........ *F15B 13/0424* (2013.01); *E02F 9/2004* (2013.01); *E02F 9/2267* (2013.01);
(Continued)

(58) Field of Classification Search
CPC ... F15B 13/0424; E02F 9/2004; E02F 9/2267; Y10T 137/5762
See application file for complete search history.

(56) References Cited

U.S. PATENT DOCUMENTS 3,707,093 A * 12/1972 Worden ............... E02F 9/2004
                                                          200/6 A
4,018,099 A *  4/1977 O'Brien ............... B60K 20/04
                                                          74/473.21
(Continued)

FOREIGN PATENT DOCUMENTS

JP      2004147519     5/2004
KR   1020080006793     1/2008
(Continued)

OTHER PUBLICATIONS

International Search Report—PCT/KR2013/011491 dated Mar. 19, 2014.

*Primary Examiner* — Craig Schneider
*Assistant Examiner* — Kevin Barss
(74) *Attorney, Agent, or Firm* — Cantor Colburn LLP

(57) ABSTRACT

A joystick pilot valve equipped with the structure for preventing oil leakage comprises: a valve body; spool installed in the valve body to be moved between the supply port and the hydraulic fluid chamber; spool hole installed in the valve body; pushing cam connected to the upper portion of the valve body by joint; joystick lever connected to the pushing cam to make the pushing cam move like seesaw by the operation and make the spool move in the spool hole forward and backward to make the supply port connected or disconnected to the hydraulic fluid chamber; outer boot provided at the valve body to cover the outer periphery of the valve body, the pushing cam and the joystick lever; inner
(Continued)

boot arranged inside of the outer boot and forming oil leak storage chamber sealed from the outer side at the upper portion of the guide hole.

7 Claims, 12 Drawing Sheets

(51) Int. Cl.
    *F15B 13/042* (2006.01)
    *F16K 31/524* (2006.01)
    *F16K 31/60* (2006.01)
    *F16K 3/02* (2006.01)
    *F16K 15/04* (2006.01)
    *F16K 11/18* (2006.01)

(52) U.S. Cl.
    CPC ............ *F16K 3/029* (2013.01); *F16K 3/0254* (2013.01); *F16K 11/185* (2013.01); *F16K 15/04* (2013.01); *F16K 31/52475* (2013.01); *F16K 31/602* (2013.01); *Y10T 137/5762* (2015.04)

(56) References Cited

U.S. PATENT DOCUMENTS

| | | | | |
|---|---|---|---|---|
| 4,445,541 A * | 5/1984 | Schmiel | ............ | F15B 13/0424 137/596.12 |
| 4,530,376 A * | 7/1985 | Chatterjea | ........... | F15B 13/0422 137/596 |
| 4,840,386 A * | 6/1989 | Peitsmeier | .......... | B60R 13/0853 277/636 |
| 4,991,457 A * | 2/1991 | Chen | .................... | F16H 59/0213 277/640 |
| 5,934,324 A * | 8/1999 | Bessard | ................. | G05G 9/047 137/636.1 |
| 5,941,123 A * | 8/1999 | Numakami | ............ | B60K 20/04 74/18 |
| 6,932,113 B1 * | 8/2005 | Kauss | ........................ | B66F 9/20 137/636.2 |
| 7,264,550 B2 * | 9/2007 | Deisinger | ............... | F16D 3/845 464/175 |
| 7,384,673 B2 * | 6/2008 | Konegen | .................. | C10M 141/06 277/635 |
| 7,407,442 B2 * | 8/2008 | Terashima | .............. | B60R 13/02 277/635 |
| 7,641,561 B2 * | 1/2010 | Moriyama | .......... | B60R 13/0846 280/780 |
| 7,695,373 B1 * | 4/2010 | Billett | ...................... | F16J 3/042 277/636 |
| 8,469,399 B2 * | 6/2013 | Allen | .................... | F16J 15/3224 277/630 |
| 8,888,132 B2 * | 11/2014 | Allen | ........................ | B62D 1/16 277/634 |

FOREIGN PATENT DOCUMENTS

| | | |
|---|---|---|
| KR | 100803963 | 2/2008 |
| KR | 1020100044037 | 4/2010 |
| KR | 1020120079559 | 7/2012 |

\* cited by examiner

JOYSTICK PILOT VALVE EQUIPPED WITH THE STRUCTURE FOR PREVENTING OIL LEAKAGE

BACKGROUND OF INVENTION

Field of the Invention

The invention relates to the joystick pilot valve equipped with the structure for preventing oil leakage, and more specifically, to the joystick pilot valve equipped with the structure for preventing oil leakage comprising the boot which may keep the alien material from penetrate in the inner portion and may keep the operation oil from leaking to the outer portion and one or more of the drain holes which may make the oil leaked from the spool called the main part flow into the inner portion of the joystick.

Moreover, the invention relates to the joystick pilot valve wherein the check valve for making the leaked oil flow into the joystick valve is set up in the drain hole and wherein the operation oil (hydraulic fluid) collected in the operation oil chamber of the valve body may not be again leaked to the outer portion of the valve body.

Description of the Related Art

Generally, the pilot valve manipulated by the joystick is widely used in the construction heavy equipment such as the excavator and load, and the actuator may be operated for driving the working machine like the boom or the bucket in response to the pilot signal pressure generated when the spool is operated by the manipulation of the driver.

As described in FIGS. 1 and 2, in case of the joystick pilot valve of the prior art, the joystick lever 1 manually operated by the worker (or the driver) is connected to the valve body 3 by the joint 2 and a plurality of push rods 5 are protruded from the upper side of the valve body 3. Accordingly, if the joystick lever 1 is manipulated, the pushing cam 10 selectively presses the push rods 5 and the spool 8 connected to the lower part of the push rod 5 may move up and down from the respective spool hole 9.

The hydraulic fluid chamber 6 is formed in the valve body 3 and the hydraulic oil is fed back to tank through the return port formed on the central part of the valve body 3. And the hydraulic oil (hydraulic fluid) supplied to the hydraulic fluid chamber 6 from the external hydraulic pump and the actuator is ejected to the respective supply port 7 of the valve body and the hydraulic oil acts as the actuator signal pressure of the working machine. In other words, a plurality of the supply ports 7 (ordinarily, 4) may be formed at the valve body 3, the supply port 7 connected with the external hydraulic pump and the actuator may be formed at the inner portion of the valve body 3, the hydraulic fluid chamber 6 connected with the external operation oil tank is equipped in the upper side of the supply port 7, and he hydraulic fluid chamber 6 may be connected with the supply port 7 or may be blocked from the supply port 7 according to the operation of the spool 8 equipped in the respective supply port 7. While the pushing cam 10 seesaws with the mechanical operation means in which the operator operates the joystick lever 1, the spool 8 may be pressed down, and when the spool 8 is pressed down, the hydraulic fluid chamber 6 may be connected with the supply port 7 in which the pressed spool 8 is installed, the hydraulic oil in the hydraulic fluid chamber 6 is supplied to the supply port 7 in which the pressed spool 8 is installed so that the supplied hydraulic oil may be acted as the actuator signal pressure of the working machine like the excavator. Therefore, the bucket of the excavator is operated, and the spool 8 is returned upward by the spring 14. That is, according to said joystick pilot valve, because the respective spools 8 block the flow passage between the respective supply ports 7 and The hydraulic fluid chamber 6, the working machine (such as bucket of the excavator and so on) is maintained at the state of stop. If, at the state of stop of the working machine, the flow passage is opened by the spool 8 which is operated by the operation of the joystick lever 1 of the driver (or the worker), the signal pressure (the hydraulic fluid pressure) through the supply port 7 connected to the hydraulic fluid chamber 6 may be supplied to the actuator, and for example, the boom of the load may be lengthened or be shortened, or the bucket of the excavator may be operated. Meanwhile, while the spool 8 returns to the original state by the force of spring 14, the hydraulic fluid returns to the hydraulic fluid chamber 6 through the return port formed in the central part of the valve body 3.

By the way, in case of the joystick pilot valve of the prior art, there is a problem that while the spool 8 linearly moves up and down by the push rod 5, the leakage of the hydraulic oil may be caused, and the foreign substance (dust etc.) introduced into boot (the boot covering the connection part of the joystick lever 1 and the valve body 3) may be mixed with the leaked hydraulic oil (hydraulic fluid) so that contamination may be caused. The leakage of the hydraulic oil is caused at the position between the guide hole 4 of the valve body in which the push rod 5 is ascended and descended and the outer periphery of the push rod 5, in other words, the position shown as LP in FIG. 1.

Moreover, as time goes by, the joystick lever 1 is unable to stand in the place but inclines due to oil leak, while the joystick lever 1 inclines, the spool 8 pressed down with the push rod 5 descends and the hydraulic fluid is supplied to the joystick valve. Therefore, there is a problem that malfunction of the valve may be caused.

SUMMARY OF THE INVENTION

The invention has been made to solve the foregoing problems with the prior art, and therefore the purpose of the invention is to provide a joystick pilot valve equipped with the structure for preventing oil leakage comprising the boot which may keep the alien material from penetrate in the inner portion and may keep the operation oil from leaking to the outer portion and one or more of the drain holes which may make the oil leaked from the spool called the main part flow into the inner portion of the joystick.

Moreover, the purpose of the invention relates is to provide the joystick pilot valve wherein one or more of the drain hole for making the hydraulic oil leaked from the spool (the main part) flow into the joystick valve may be provided to keep the hydraulic oil from being leaked to the outer side so that the serious problem may be prevented that the bucket of the excavator may be operated without desire and the contamination of the hydraulic oil owing to penetration of the alien substance may be prevented.

Moreover, the purpose of the invention relates is to provide the joystick pilot valve wherein the check valve for making the leaked oil flow into the joystick valve is set up in the drain hole and wherein the operation oil (hydraulic fluid) collected in the operation oil chamber of the valve body may not be again leaked to the outer portion of the valve body so that the reliability on the operation may be enhanced more.

BRIEF DESCRIPTION OF THE DRAWINGS

The above and other aspects, features and advantages of certain exemplary embodiments of the invention will be more apparent from the following description taken in conjunction with the accompanying drawings, in which.

DETAILED DESCRIPTION OF THE INVENTION

Figure 1:
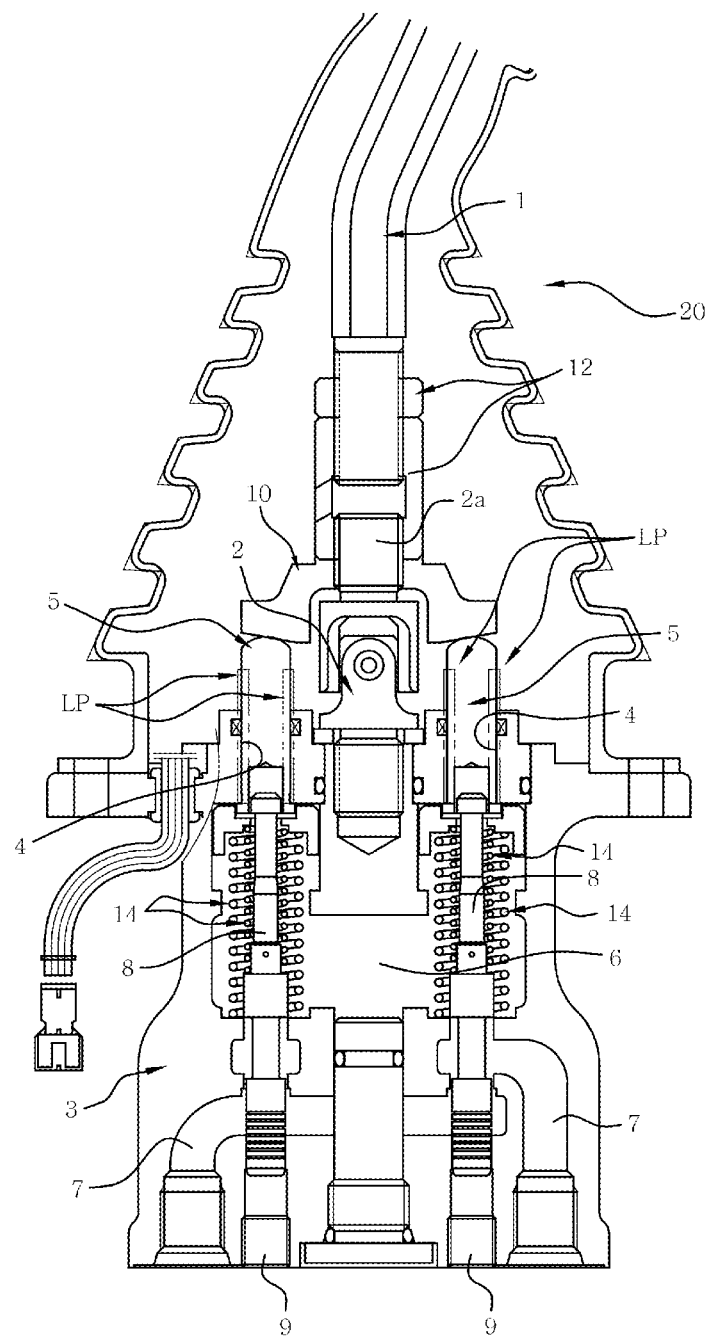
FIG. 1 is a cross-sectional view showing the structure of the conventional joystick pilot valve.
Figure 2:
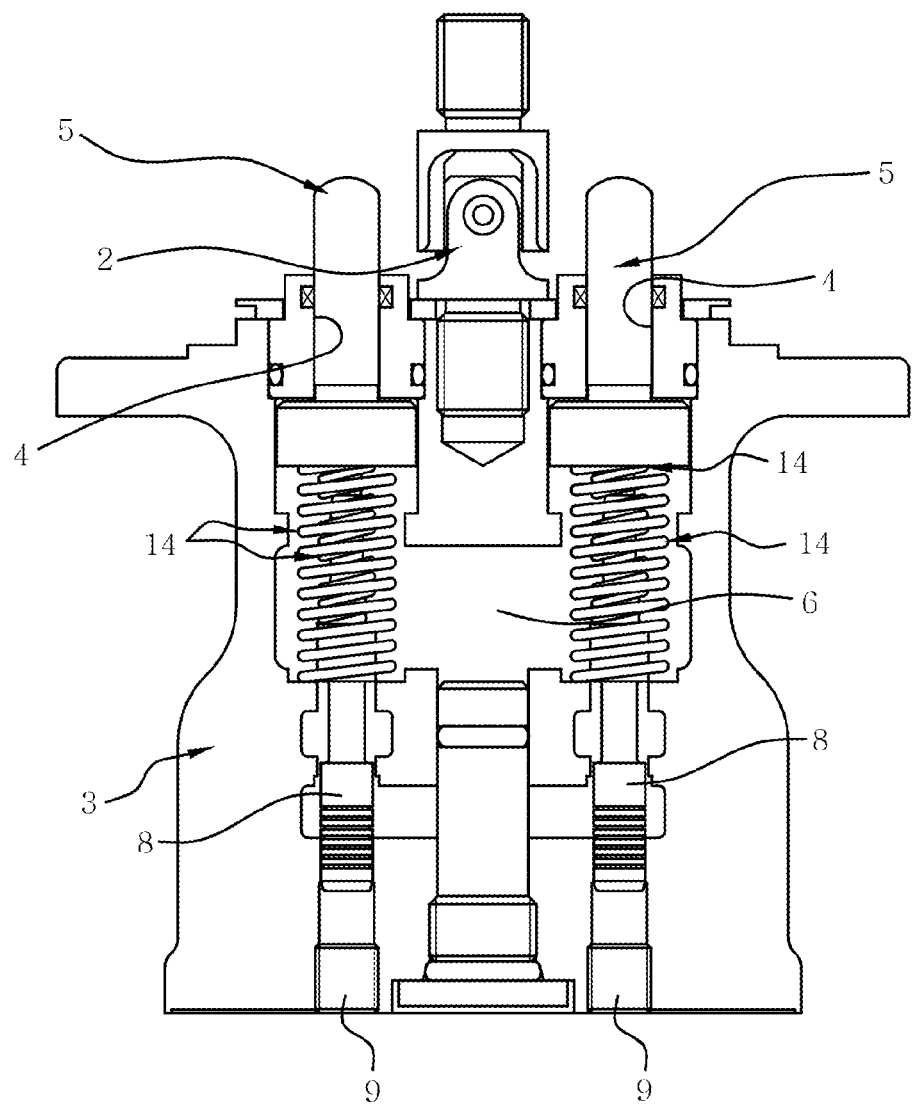
FIG. 2 is a photograph showing the configuration of the valve body which is the main part illustrated in FIG. 1.

The invention will now be described more fully hereinafter with reference to the accompanying drawings, in which exemplary embodiments thereof are shown.

Referring to the attached drawings, the joystick pilot valve equipped with the structure for preventing oil leakage according to the invention may be altogether applied to the normal working machine to the oil-hydraulic system equipped with the hydraulic operation type actuator including the excavator, the hydraulic motor, the hydraulic cylinder etc.

The joystick pilot valve of the invention has the structure that a plurality of spools 8 (at least two spools) are installed inside the valve body 3. The spools 8 may ascend and descend inside the valve body 3. The joystick pilot valve of the invention has actuating means for reciprocating each spool 8 in top and bottom direction. The actuating means includes push rod 5 arranged in the upper portion of the spool 8, pushing cam 10 for pressing the push rod 5 to the inner side of the valve body 3 and spring 14 for supporting each spool 8 upwardly.

The valve body 3 is comprised of the structure in which the supply port 7 connected with the external hydraulic pump and actuator is equipped in the inside of bottom and the hydraulic fluid chamber 6 connected with the external operating oil tank is equipped in the upper side. And link passage is formed between the supply port 7 and hydraulic fluid chamber 6. The spool 8 is movably inserted in the link passage. Spool hole 9 is formed in the lower portion of the link passage. The lower end portion of the spool 8 is inserted in the spool hole 9. Although not illustrated, the pump port connected to the hydraulic pump is formed in the supply port 7 and the tank port connected to the operating oil tank is formed in the hydraulic fluid chamber 6.

The lower end portion of the push rod 5 is connected to the spool 8 and the upper end portion of the push rod 5 is protruded outside the valve body 3. The push rod 5 is installed to be movable toward the top and bottom direction by the guide of tube type. And the cyclic supporting plate is installed in the connection part of the spool 8 and the push rod 5. The spring 14 is installed inside the hydraulic fluid chamber 6 in order to support the supporting plate upwardly.

The central part of the pushing cam 10 is connected to the upper center of the valve body 3 with joint 2 (it can become the universal joint when necessary). The pushing cam 10 is rotatably arranged in the upper portion of the valve body 3 in the form of the seesaw. The part of this pushing cam 10 separated from the pivot point (in other words, the joint 2 part) presses the upper end portion protruded outside of the respective push rod 5. The connection shaft which the screw part is provided in the outer periphery may be formed at the upper center part of the pushing cam 10. And the screw part is equipped in the lower outer periphery of the joystick lever 1 arranged in the upside of the pushing cam 10. The joystick lever 1 is interconnected in the pushing cam 10 with the nut 12 co-connected in the screw part of the connection shaft and the screw part of the joystick lever 1. More exactly, the threaded hole is formed in the central part of the pushing cam 10, and the connection shaft equipped with the screw part is provided in the top surface center of the joint 2. The screw part provided at the outer periphery of the joint 2 is combined in the threaded hole of the pushing cam 10 as bolt type, and the screw nut 12 is combined in some part of the screw part of the connection shaft outer periphery protruded to the upper side of the pushing cam 10 and the screw part of the joystick lever 1 provided at the outer periphery. In this way, the joystick lever 1 and the pushing cam 10 may be interconnected.

The spool 8 includes the normal structure in which the expand diameter part is formed with a predetermined interval in order to open and close the link passage between the supply port 7 and the hydraulic fluid chamber 6. This spool 8 is movably inserted in the valve body 3 through the supply port 7 and the hydraulic fluid chamber 6. The spool 3 may be moved to the longitudinal direction of the valve body 3 (so to speak, the upper and lower direction of the valve body 3). The spool 3 is installed in the valve body 3 in order to adjust the flow of hydraulic fluid between hydraulic pump, actuator and actuation oil tank. A plurality of the spools 8 are equipped in the valve body 3 based on the central part of the valve body 3. In the invention, four spools 8 are equipped based on the central part of the valve body 3.

In the meantime, according to the embodiment of the invention, the supply port 7 is comprised of the duct type, and the hydraulic fluid chamber 6 is comprised of the chamber shape, and two supply ports 7, in other words, two supply ports 7 are arranged in the upper and lower direction. However, the invention may be applied to the normal valve comprised of the various shape and position of the supply port 7 and the hydraulic fluid chamber 6.

Moreover, in the embodiment of the invention, the pushing cam 10 and the spring 14 have been exemplified as the actuating means for reciprocating the spool 8. However, this actuating means may be configured with the various structures for reciprocating the spool 8 in the normal valve.

The spool hole 9 for reciprocating the spool 8 to the longitudinal direction is equipped in the inner portion of the valve body 3. The spool hole 9 is formed inside the valve body 3 toward top and bottom direction in order to make the spool 8 be ascended and descended toward the top direction and the bottom direction of the valve body 3. This spool hole 9 is connected with the hydraulic fluid chamber 6 or is intercepted with connection according to the longitudinal direction reciprocation movement of the spool 8. That is, according to the reciprocation movement of the spool 8, the fluid path between the hydraulic fluid chamber 6 and the spool hole 9 may be opened and closed.

Moreover, the valve body 3 has the hydraulic fluid chamber 6 provided in the inner upper position of the spool hole 9. And, the valve body 3 has the guide hole 4 which is arranged in the upper position of the hydraulic fluid chamber 6 and faces the spool hole 9 at right upper position. In the guide hole 4, the lower end portion is connected to the hydraulic fluid chamber 6 and the upper end portion is connected to the upper side of the valve body 3. The push rod 5 is movably joined in the guide hole 4, and the upper end portion of the spool 8 is connected to the lower end portion of the push rod 5 by supporting plate. The push rod 5 is pressed down according to the seesaw movement of the pushing cam 10. If the push rod 5 is pressed down, the spool is pressed down and the fluid path between the hydraulic fluid chamber 6 and the supply port 7 may be opened.

The outer boot 20 is installed in order to cover the valve body 3, the pushing cam 10 and outside of the joystick lever 1. This outer boot 20 has the structure of flexible spring tube boot wherein a plurality of corrugations 24 are extended to the columnar direction based on central part and the corrugations 24 are arranged along upper and lower direction with a predetermined interval. Flange part provided at the lower end of the outer boot 20 and extended toward radius direction are connected to flange part provided at the upper end portion of the valve body 3 and extended toward radius direction by the fastener such as bolt and so on. In this way, the lower end portion of the outer boot 20 is connected to the upper end portion of the valve body 3. Moreover, the upper end portion of the outer boot 20 is connected to the outer periphery of the joystick lever 1.

The inner boot 30 is arranged in the inner portion of the outer boot 20. The inner boot 30 may form the leak oil storage chamber 32 (in other words, the leak oil storage chamber for accommodating the leaked hydraulic fluid) which is sealed from the outside surroundings on the upper position of the guide hole 4 in which the spool 8 of the valve body 3 is moved forward and backward. While the spool 8 (so to speak, the push rod 5 and the spool connected to the push rod 5) moves forward and backward along the upper direction and the lower direction, the leaked oil (the leaked hydraulic fluid) may be kept in the leak oil storage chamber 32 so that the phenomenon may be prevented that the leaked oil is leaked outside the valve of the invention.

Specifically, the base end of the inner boot 30 is connected to the valve body 3 and the front end of the inner boot 30 is connected to the joystick lever 1 connected to the pushing cam 10. At least, pushing cam 10 and some part of the push rod 5 upwardly protruded from the guide hole 4 of the valve body 3 may be installed in the encapsulated type leak oil storage chamber 32 formed in the inner boot 30. In the invention, the connection shaft 2a of which the screw part is provided in the outer periphery may be equipped at the upper center part of the pushing cam 10, and the screw part is formed at the lower outer periphery of the joystick lever 1 arranged in the upper position of the pushing cam 10. The joystick lever 1 is connected to the pushing cam 10 by the nut 12 co-connected in the screw part of the joystick lever 1 and the screw part of the connection shaft of the pushing cam 10. The front end of the inner boot 30 is combined in the outer periphery of the joystick lever 1 so that the pushing cam 10, the push rod 5 and the nut 12 may be arranged in the leak oil storage chamber 32. That is, the upper side of the valve body 3, the pushing cam 10, the push rod 5 and the nut 12 (the connection part of the pushing cam 10 and the joystick lever 1) may be protected by the inner boot 30 from the outside and a part of the bottom side of the joystick lever 1 may be protected by the inner boot 30 from the outside. Of course, it is natural that the upper end portion (the top end part) of the inner boot 30 is connected to the nut 12 part around the upper side of the pushing cam 10 (in other words, the outer periphery of the nut 12 near the upper surface of the pushing cam 10 among the connection part between the joystick lever 1 and the pushing cam 10). In this case, the inner boot 30 protects only the upper side of the valve body 3, the pushing cam 10 and the push rod 5 from the outside.

Moreover, the inner boot 30 is made of the flexible spring tube boot structure where a plurality of corrugations 34 and both end parts of the inner boot 30 is respectively connected to the upper circumference of the valve body 3 and the outer periphery of the joystick lever 1 by the fixing means. The inner boot 30 has the flexible spring tube boot form wherein a plurality of corrugations 34 are extended to the columnar direction based on the central part and the corrugations 34 are equipped along upper and lower direction of the inner boot 30 by a predetermined interval.

In the meantime, in the invention, the lower end portion of the inner boot 30 is connected to the valve body 3 by the band. That is, the band can be employed as the fixing means between the base end part (lower end portion) of the inner boot 30 and the valve body 3. And the upper end portion of the inner boot 30 is also connected to outer periphery of the joystick lever 1 (the outer periphery of the nut 12 which connects the joystick lever 1 and the pushing cam 10). That is, the band may be also employed as the fixing means between the top-end part (upper end portion) of the inner boot 30 and the joystick lever 1.

Moreover, the invention may further comprise at least one or more of the drain hole 42 connected between the hydraulic fluid chamber 6 and the leak oil storage chamber 32. One end of the drain hole 42 is connected with he hydraulic fluid chamber 6 and another end of the drain hole 42 is connected with the leak oil storage chamber 32 formed by the inner boot 30. In the invention, the drain hole 42 may be formed over at least two. Both end parts of this drain hole 42 is respectively connected with the upper side of the valve body 3 and the hydraulic fluid chamber 6 formed in the inner portion of the valve body 3. That is, the drain hole 42 becomes the path for again revolving the leak oil to the hydraulic fluid chamber 6 the inner portion of the valve body 3 in case that the hydraulic fluid (oil) is leaked from the guide hole 4 (in other words, the hole in which the push rod 5 is ascended and descended) of the valve body 3.

The whole operation of the joystick pilot valve of the invention structured as mentioned is achieved similarly with the conventional joystick valve. That is, if the operator pushes the joystick lever 1 or the operator pulls the joystick lever 1 and the pushing cam 10 is circulated, the push rod 5 selectively pressed down by the pushing cam 10 may press down the spool connected to the lower part, and if the thrust force by the pushing cam 10 is canceled, the spool 8 is returned upward by the spring 14. According to the position of each spool 8 by this operation, the hydraulic fluid supply direction and flow rate between the hydraulic pump, actuator and operating oil tank may be controlled through the supply port 7 and the hydraulic fluid chamber 6. Therefore, for example, the bucket of the excavator and so on may be operated.

At this time, the invention further comprises the inner boot 30 as the key configuration and may expect the advantage capable of preventing the outside leak oil of the hydraulic fluid and inflow of alien substances. That is, the pushing cam 10 seesaws to press the push rod 5 while the operator for the excavator and so on catches the joystick lever 1 and manipulate the push rod 5, and the push rod 5 is pressed down and the spool 8 is also pressed down, and when the press force of the push rod 5 is canceled, the spool 8 is elevated (elevated by the elastic force of spring 14) again to the upper position, the oil leakage may be happened at the position of the guide hole 4 in which the push rod 5 of the valve body 3 and the leaked oil (so to speak, leaked hydraulic fluid) is flowed out the upper portion of the valve body 3. However, in the invention, because the leak oil storage chamber 32 sealed from the outside by the inner boot 30 is formed in the upper position of the valve body 3, the problem may be solved that the alien substance penetrated in the outer boot 20 (the boot covering the connection part of the joystick lever 1 and valve body 3) is mixed into the leaked hydraulic fluid and the hydraulic fluid (operation oil) is contaminated.

Moreover, the invention may keep the oil (the hydraulic fluid) from being leaked around the spool 8 which is the main part key, and may prevent the case that the joystick lever 1 is unable to stand in the place as time goes by to be inclined. Like the above, the invention may prevent the joystick lever 1 from being slanted as time goes by, and may prevent the case that the spool 8 pressed down by the push rod 5 descends without desire and the hydraulic fluid is supplied undesirably to the hydraulic fluid used place (for example, the bucket operation fluid pressure unit of the excavator etc.). Accordingly, the invention may prevent the malfunction of the valve. The invention is not only the mis-operation prevention of this joystick pilot valve but also the invention may solve the serious problem like as the bucket of the excavator and so on may be malfunctioned without desire.

Moreover, the invention has the structure that at least one drain hole 42 is connected between the outside encapsulated type leak oil storage chamber 32 formed in the upper side of the valve body 3 by the inner boot 30 and the hydraulic fluid chamber 6 of the inner portion of the valve body 3. If oil leakage (the hydraulic fluid leakage) may be happened through the guide hole 4 in which the push rod 5 of the valve body 3 straightens up and down and the leaked oil (hydraulic fluid) flows into the leak oil storage chamber 32, the leaked oil (hydraulic fluid) of the leak oil storage chamber 32 again circulates through the drain hole 42 to the hydraulic fluid chamber 6 in the valve body 3. Therefore, according to the invention, it is more effective to solve the serious problems like the oil contamination problem by the mixture of the alien substance and the above-described hydraulic fluid and the problem of the malfunction of the excavator bucket due to the valve malfunction.

Figure 6:
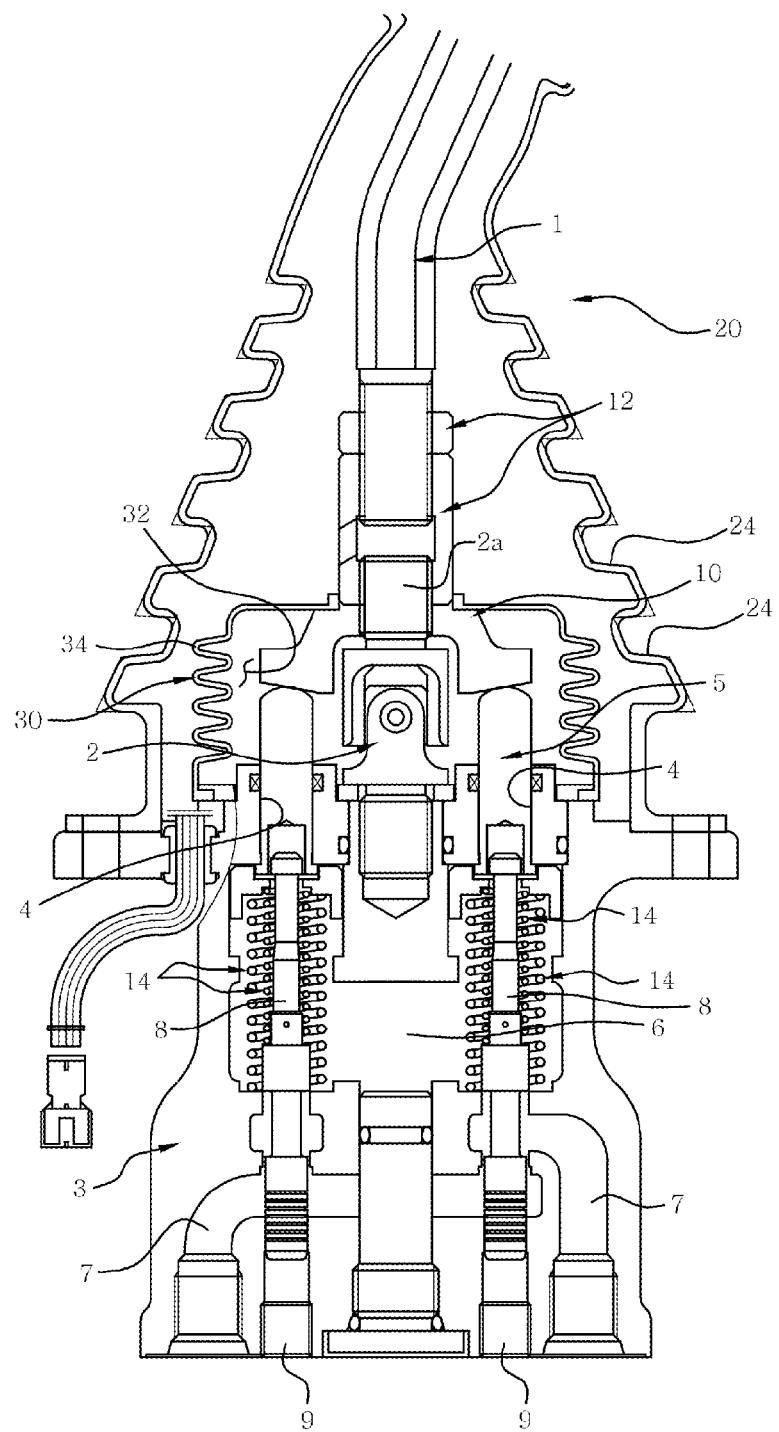
FIG. 6 is a cross-sectional view showing the structure of the joystick pilot valve according to a second embodiment of the invention.

In case of the invention, as described in FIG. 6, the upper end portion (top-end part) of the inner boot 30 is connected to nut 12 part (in other words, the outer periphery of nut 12 around the pushing cam 10 among the connection part between the joystick lever 1 and the pushing cam 10) around the upper side of the pushing cam 10. The invention may have the structure that the inner boot 30 is equipped in the upper side of the valve body 3.

Figure 3:
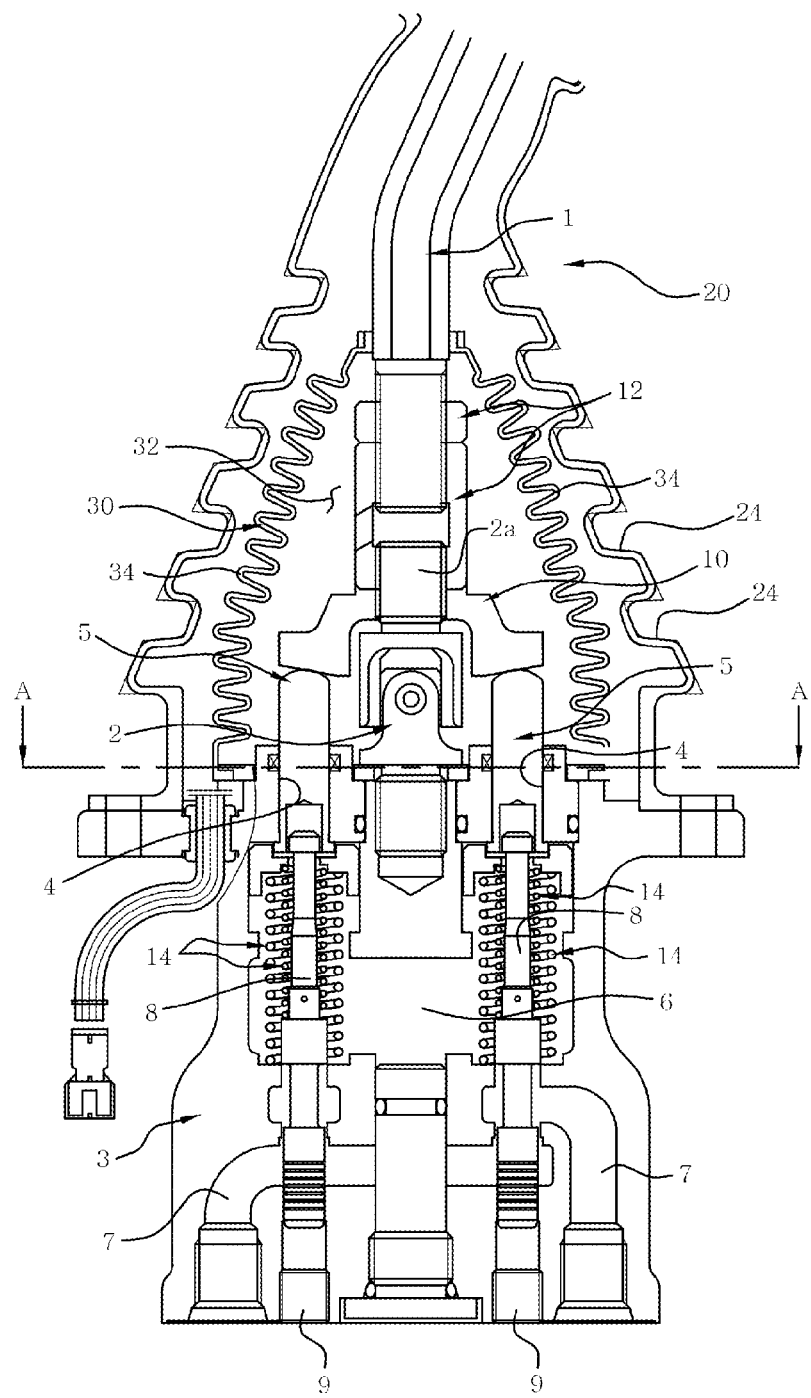
FIG. 3 is a cross-sectional view showing the structure of the joystick pilot valve of the invention.
Figure 4:
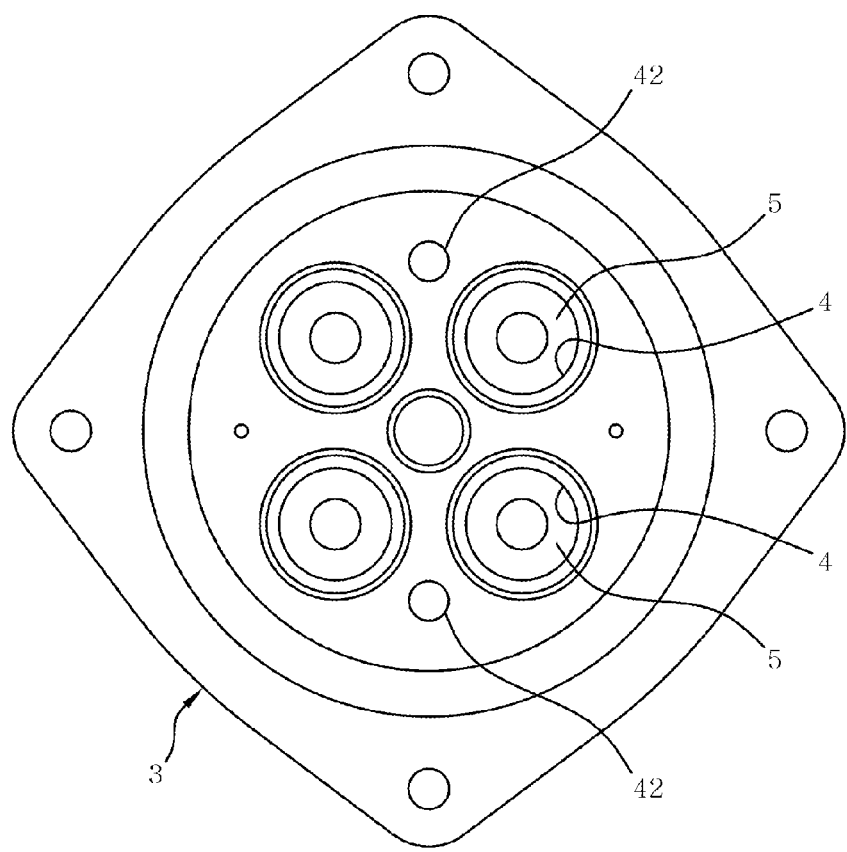
FIG. 4 is A-A line sectional view of FIG. 3.
Figure 5:
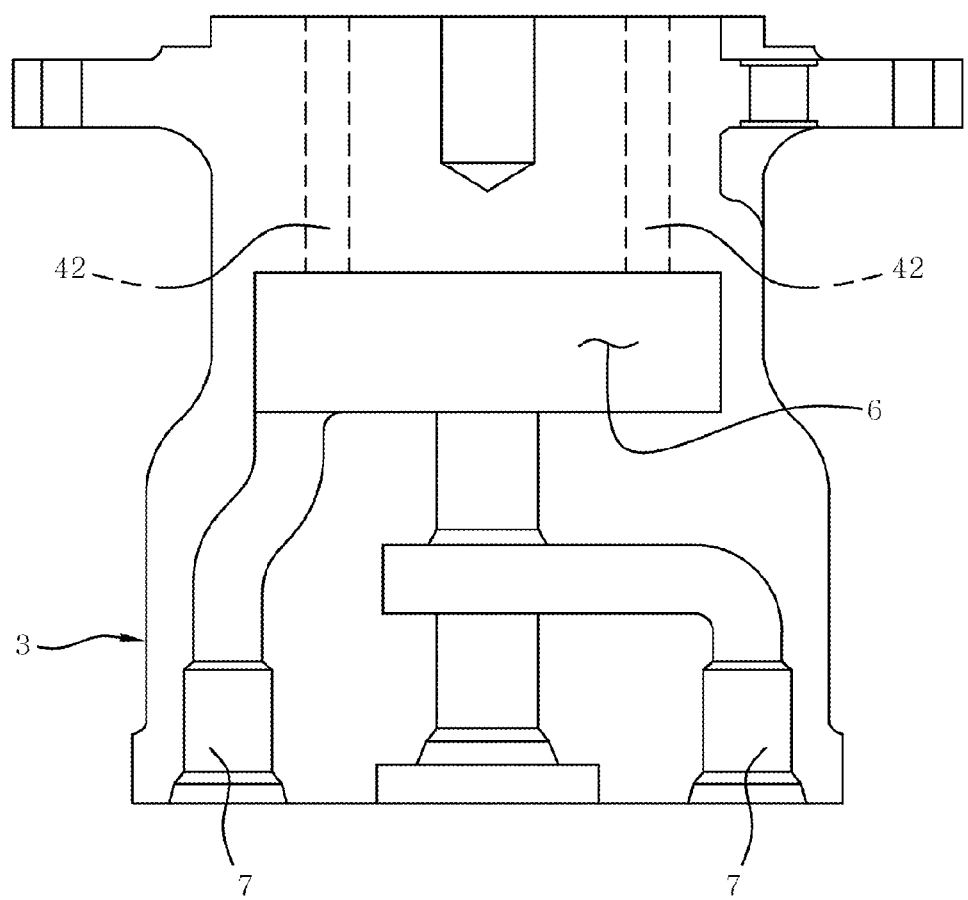
FIG. 5 is a cross-sectional view showing the structure of the valve body illustrated in FIG. 3.

By the way, as shown in FIG. 3, in case the upper side of the valve body 3 and the pushing cam 10 and the push rod 5 and nut (the connection part of the pushing cam 10 and the joystick lever 1) are protected by the inner boot 30 from the outside and a part of the bottom side of the joystick lever 1 has the configuration of being protected from the outside, it is much more effective to prevent malfunction including the above-described oil leakage, the valve malfunction and excavator bucket and so on.

As described above, the threaded hole is formed in the central part of the pushing cam 10. The connection shaft 2a is equipped in the top surface center of the joint 2. The connection shaft 2a has the screw part in the outer periphery.

The screw part provided at the outer periphery of the connection shaft 2a of the joint 2 is combined in the threaded hole of the pushing cam 10 at the bolt type, and the screw nut 12 is commonly combined in some part of the screw part of the connection shaft 2a protruded to the upper side of the pushing cam 10 and the screw part of the joystick lever 1. In this way, the joystick lever 1 and the pushing cam 10 are interconnected. The hydraulic fluid in the hydraulic fluid chamber 6 may be leaked between the connection part of the valve body 3 and the joint 2. The leaked oil (hydraulic fluid) as described above may flow out between the connection part of the connection shaft and the nut 12 as well as between the connection shaft of the joint 2 and the pushing cam 10. In this case, the efficiency can drop as to the prevention function of the hydraulic fluid contamination and the valve malfunction.

By the way, as shown in FIG. 3, by having the configuration wherein the upper side of the valve body 3, the pushing cam 10, the push rod 5 and nut 12 may be protected by the inner boot 30 from the outside and even a part of the bottom side of the joystick lever 1 may be protected from the outside, the phenomenon may be prevented that the hydraulic fluid is leaked around the connection portion between the connection shaft 2a of the joint 2 and the nut 12 as well as the connection portion between the joint 2 and the pushing cam 10. Therefore, it can completely block that the effectiveness is decreased as to the hydraulic fluid contamination by the prevention of oil leakage and valve malfunction. That is, it is important that the inner boot 30 may form the leak oil storage chamber 32 completely sealed from the outside for the part in which the oil leak may be happened.

Figure 7:
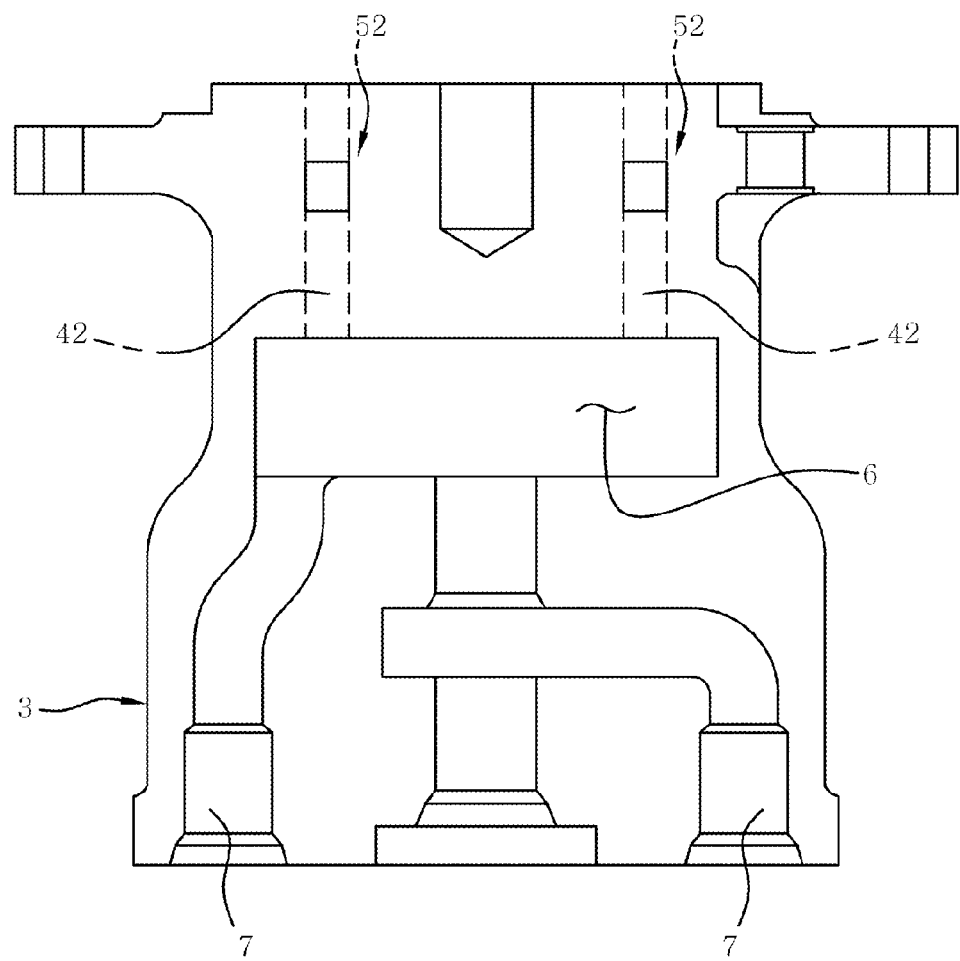
FIGS. 7 to 9 are the drawings showing the structure a third embodiment of the invention.
Figure 8:
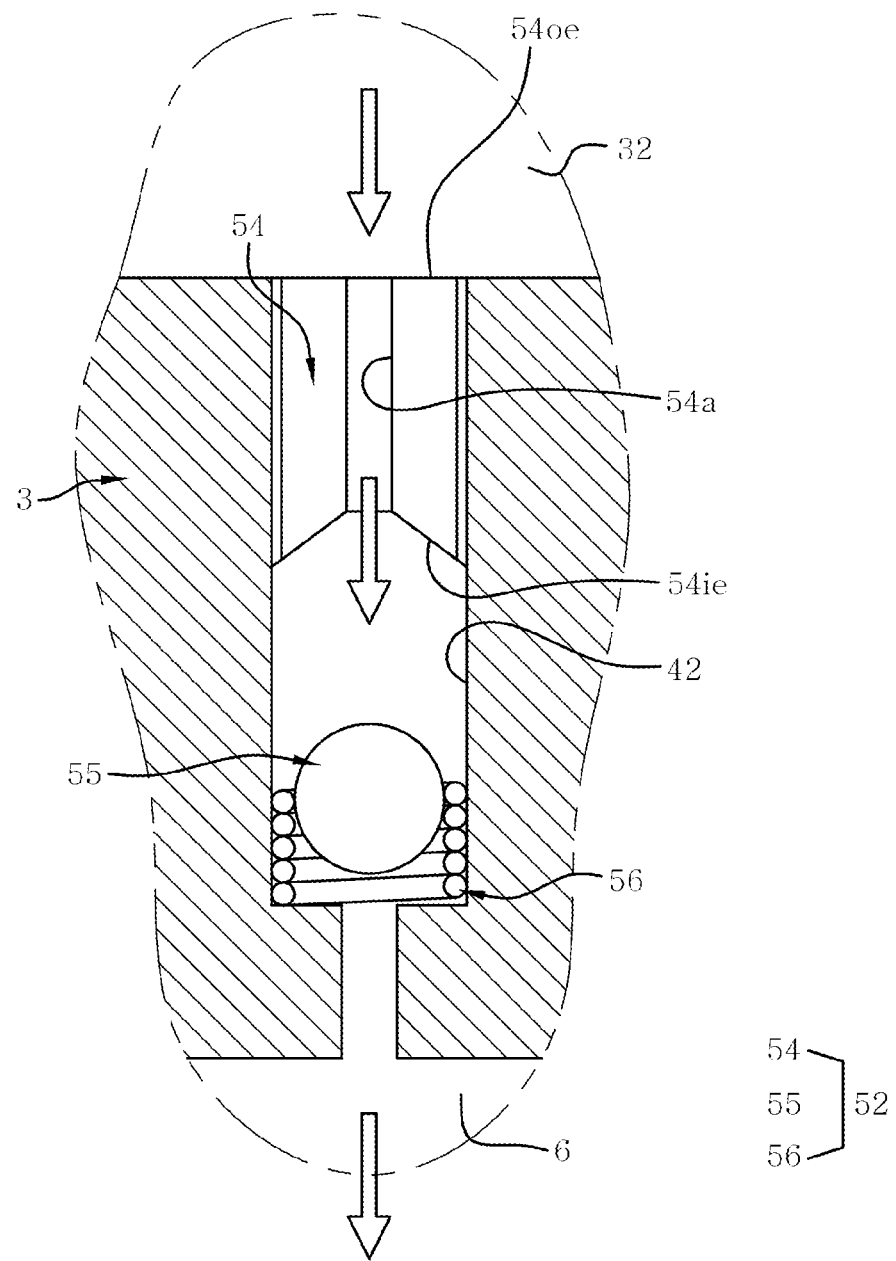
Figure 9:
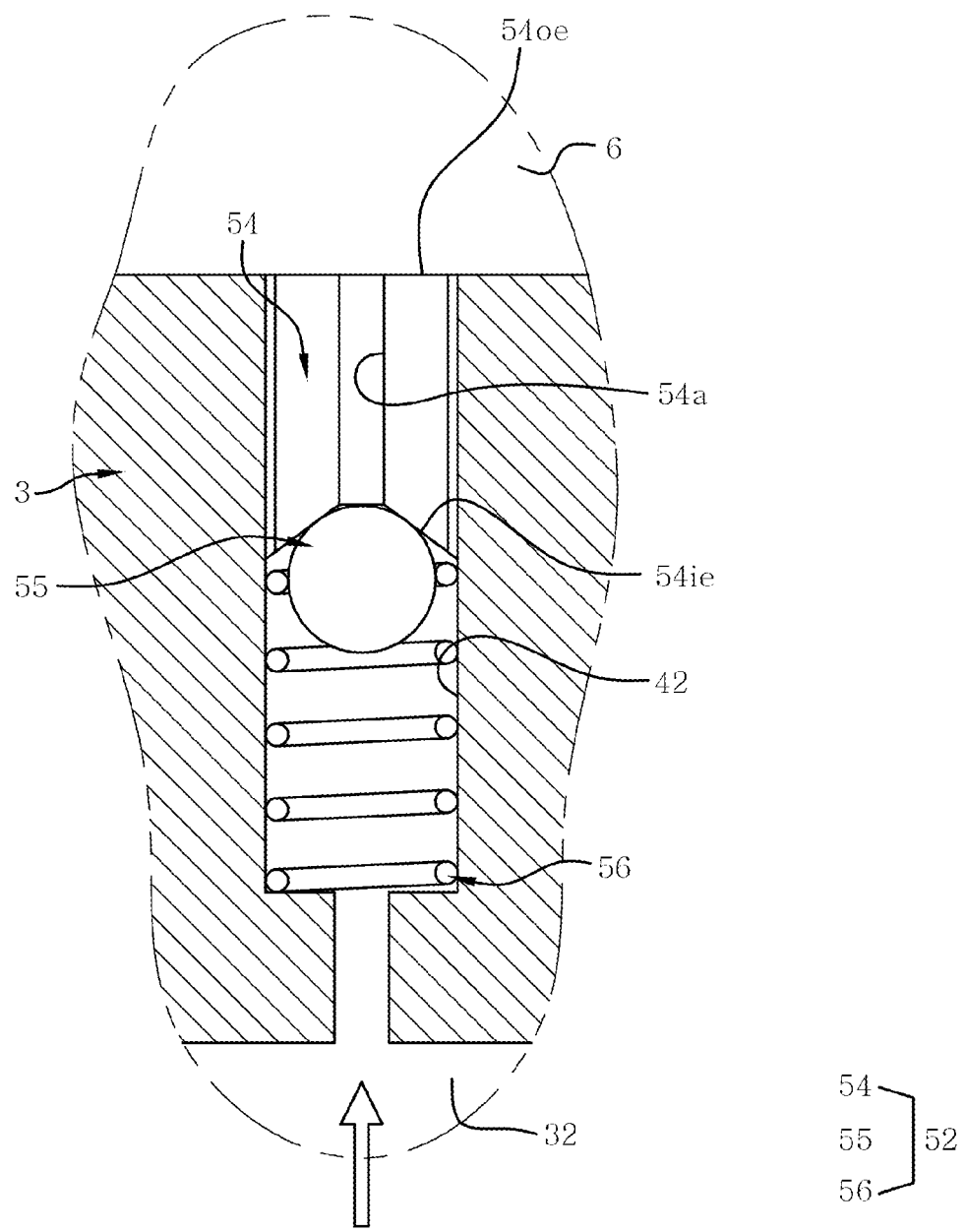

In the meantime, FIGS. 7 to 9 are drawings showing a second embodiment of the invention. According to the invention shown in FIGS. 7 to 9, the check valve 52 is further installed in the drain hole 42. The check valve 52 has the function that the hydraulic fluid flowed out toward the leak oil storage chamber 32 and flowed into the hydraulic fluid chamber 6 through the drain hole 42 may be flowed out toward the inner portion of the leak oil storage chamber 32.

At this time, the check valve 52 includes valve seat 54, check ball 55 and elastic member 56.

The valve seat 54 is comprised of the tube type wherein the screw part is formed in the outer periphery in order to be connected in the screw part formed in a part of the inner periphery of the drain hole 42 as bolt type 42 and the oil path 54a connected with the outer end 54oe and the inner end 54ie is provided in the inner portion. Therefore, the valve seat 54 can be steadily set up in the drain hole 42 by combining the bolt type with the outer periphery screw part of the valve seat 54 with the screw part of the drain hole 42 as bolt type. The space in which the check ball 55 may move forward and backward is secured between the inner end 54ie and the drain hole 42 of the valve seat 54. Moreover, in the inner end 54ie of the valve seat 54, the ball mounting portion of the tapered groove type is equipped so that the check ball 55 is seated.

The check ball 55 is installed in the space between the inner end 54ie of the valve seat 54 and the drain hole 42 (so to speak, in the space secured between the inner end 54ie of the valve seat 54 and the drain hole 42).

Generally, the elastic member 56 has the coil spring structure. It is installed between the check ball 55 and the drain hole 42. And, the check ball 55 adheres closely to the inner end 54ie of the valve seat 54 with the elastic force of the elastic member 56. The oil path 54a of the valve seat 54 is closed in the normal times with the check ball 55.

Therefore, according to a second embodiment of the invention illustrated in FIGS. 7 to 9, the check ball 55 is located in the inner end 54*ie* of the valve seat 54 and the oil path 54*a* is opened by the pressure of the hydraulic fluid when the hydraulic fluid leaked into the leak oil storage chamber 32 is returned toward the hydraulic fluid chamber 6 through the drain hole 42. Therefore, the hydraulic fluid can be smoothly returned from the leak oil storage chamber 32 to the hydraulic fluid chamber 6. In the meantime, because the check ball 55 already adheres closely to the inner end 54*ie* of the valve seat 54 with the elastic force of the elastic member 56 when the hydraulic fluid is returned to the hydraulic fluid chamber 6 again, the case that the hydraulic fluid returned in the hydraulic fluid chamber 6 is again leaked toward the leak oil storage chamber 32 may be prevented certainly, and like this, the invention may prevent the hydraulic fluid from being flowed out again by the check valve 52 and has the advantage of more and more enhancing the working dependability of the joystick pilot valve.

Figure 10:
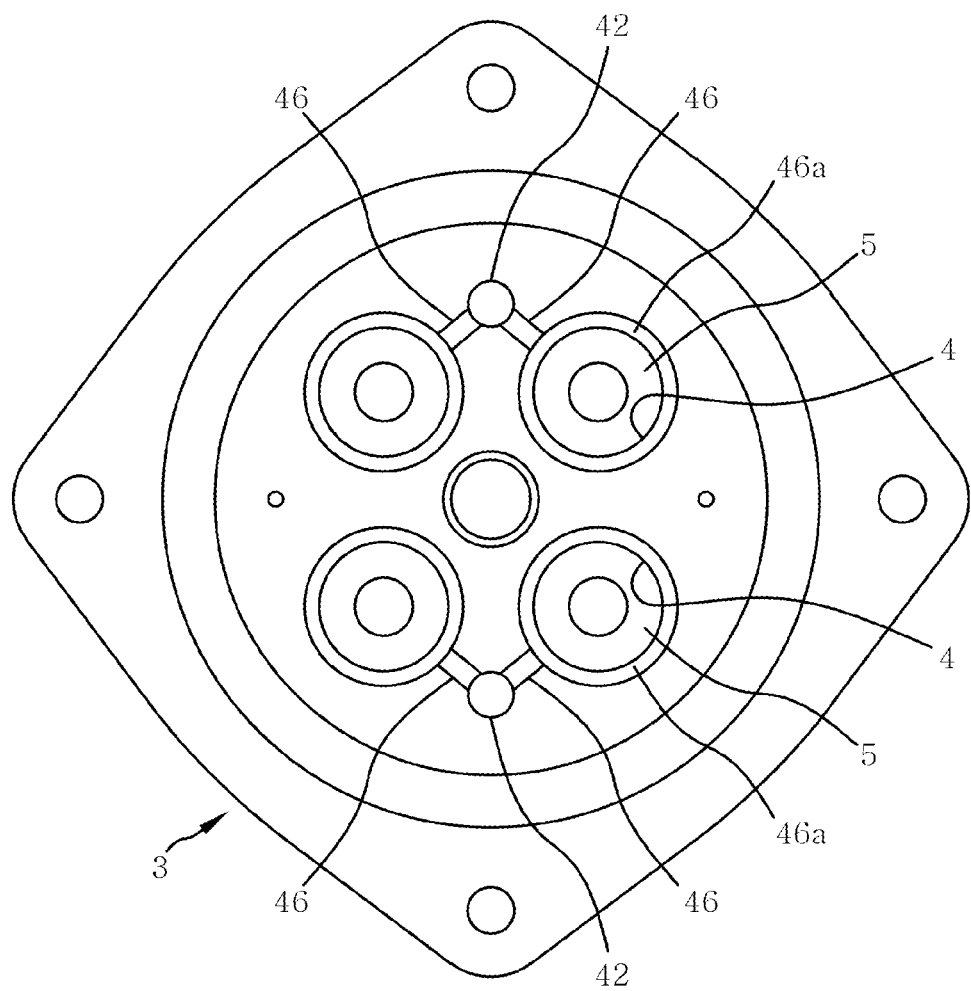
FIG. 10 is a plan view showing the structure of a forth embodiment of the invention.

On the other hand, FIG. 10 is a plan view showing the major structure of a third embodiment of the invention. According to a third embodiment of the invention, the inflow guide groove 46 is provided on the upper surface of the valve body 3 embedded in the inner boot 30. The inflow guide groove 46 is extended from the spool hole 9 in which the spool 8 is movably installed to the drain hole 42. Four spool holes 9 and two drain holes 42 are provided in the valve body 3. Four spool holes 9 and two drain holes 42 are opened to the top surface of the valve body 3. Two inflow guide grooves 46 are extended to one drain hole 42 and the other two guide grooves 46 are extended to another drain hole 42. Preferably, the height of the bottom surface of the inflow guide groove 46 is getting to be less and less from the spool hole 9 to the drain hole 42.

Therefore, according to a third embodiment of the invention shown in FIG. 10, if the hydraulic fluid (operation oil) is leaked from the spool hole 9 of the valve body 3 to the top surface of the valve body 3, the leaked hydraulic fluid may immediately be flowed into the drain hole 42 along the inflow guide groove 46 extended from the spool hole 9 to the drain hole 42 to be flowed in the hydraulic fluid chamber (operation oil chamber) provided in the valve body 3. Accordingly, the invention may much more increase the reliability of the joystick pilot valve by the prevention of the oil leakage. The major characteristic of the invention is that the oil leaked on the top surface of the valve body 3 is not remained on the top surface of the valve body 3 but is immediately flowed into the hydraulic fluid chamber provided in the valve body 3 through the inflow guide groove 46. Accordingly, the invention may prevent the malfunction of the valve. The advantage of the invention is not limited only to prevent the malfunction of the valve but the invention may more and more make assurance doubly sure as to preventing the serious problem like as the bucket of the excavator and so on may be malfunctioned without desire. In the meantime, because the height of the bottom surface of the inflow guide groove 46 is getting to be less and less from the spool hole 9 to the drain hole 42, the leaked oil may not be remained in the inflow guide groove 46 but may be clearly flowed into the drain hole 42. In order to prevent the leaked oil from being remained in the inflow groove 46 by any chance, it may also be the important characteristic of the invention that the bottom surface of the inflow guide groove 46 is getting to be less and less from the spool hole 9 to the drain hole 42. In the meantime, the closed loop type subsidiary guide groove 46*a* may be provided on the top surface. The subsidiary guide groove 46*a* may be positioned around the spool hole 9 and one end part of the inflow guide groove 46 is connected to the subsidiary guide groove 46*a*. Accordingly, the oil leaked from the spool hole 9 is not flowed toward the other place but the leaked oil may be collected in the closed loop type subsidiary groove 46*a* and may be immediately flowed in the inflow guide groove 46 to be flowed into the drain hole 42. The subsidiary groove 46*a* around the spool hole 9 has the guide function that the oil leaked from the spool hole 9 is not flowed to the unwanted place but may be flowed only into the inflow guide groove 46. So to speak, if the oil is leaked on the top surface of the valve body 3 through the spool hole 9, the leaked oil is collected in the subsidiary guide groove 46*a* provided around the spool 9 like ditch. And the collected oil in the subsidiary groove 46*a* may not be flowed to unwanted place but may be flowed only into the inflow guide groove 46. Like this, the function of the subsidiary groove 46*a* is also important that the leaked oil is collected around the spool hole 9 and is flowed only into the inflow guide groove 46.

Figure 11:
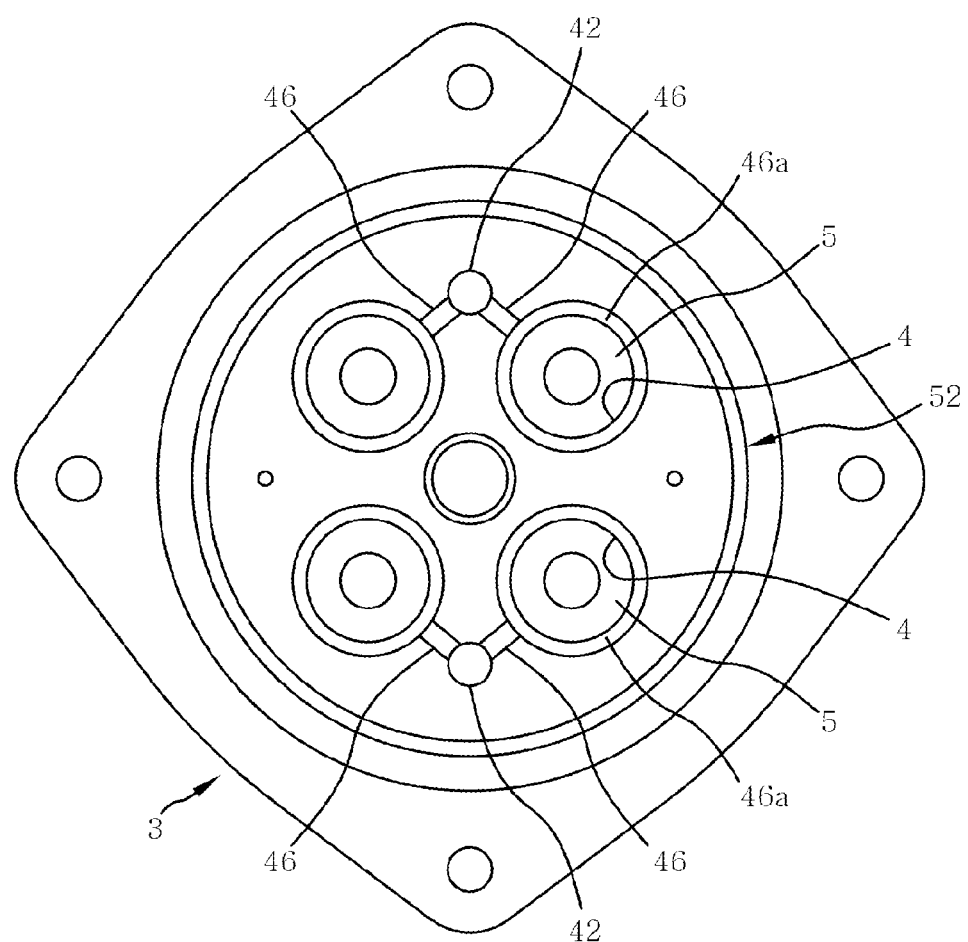
FIG. 11 is a plan view showing the structure of a fifth embodiment of the invention.

Moreover, FIG. 11 is a plan view showing the major configuration of a third embodiment of the invention. According to a third embodiment of the invention shown in FIG. 11, the closed loop type storage pool 52 is provided on the top surface of the valve body 3. The spool hole 9 and the drain hole 42 are arranged in the inner range of the storage pool 52. The storage pool 52 is extended from the top surface of the valve body 3 to the upper direction by a predetermined height and may have the pool structure for enclosing the range provided with the spool hole 9 and the drain hole 42 at the outer position.

Therefore, in case of a third embodiment of the invention shown in FIG. 11, the oil leaked through the spool hole 9 is collected in the inner range of the storage pool 52 and it is prevented that the leaked oil is flowed out the valve body 3, and the leaked oil in the storage pool 52 may be returned into the hydraulic fluid chamber 6 of the valve body 3 through the drain hole 42. The operation may be surely performed that the oil leaked on the top surface of the valve body 3 may be again returned into the hydraulic fluid chamber 6. That is, because the leaked oil may be confined in the inner range of the storage pool 52 and it is not flowed out toward unwanted place, it is more certain and more safe as to recollecting the leaked oil. At this time, if the inflow guide groove 46 shown in FIG. 10 is provided on the top surface of the valve body 3, the synergy effect may be expected as to recollecting the leaked oil.

Figure 12:
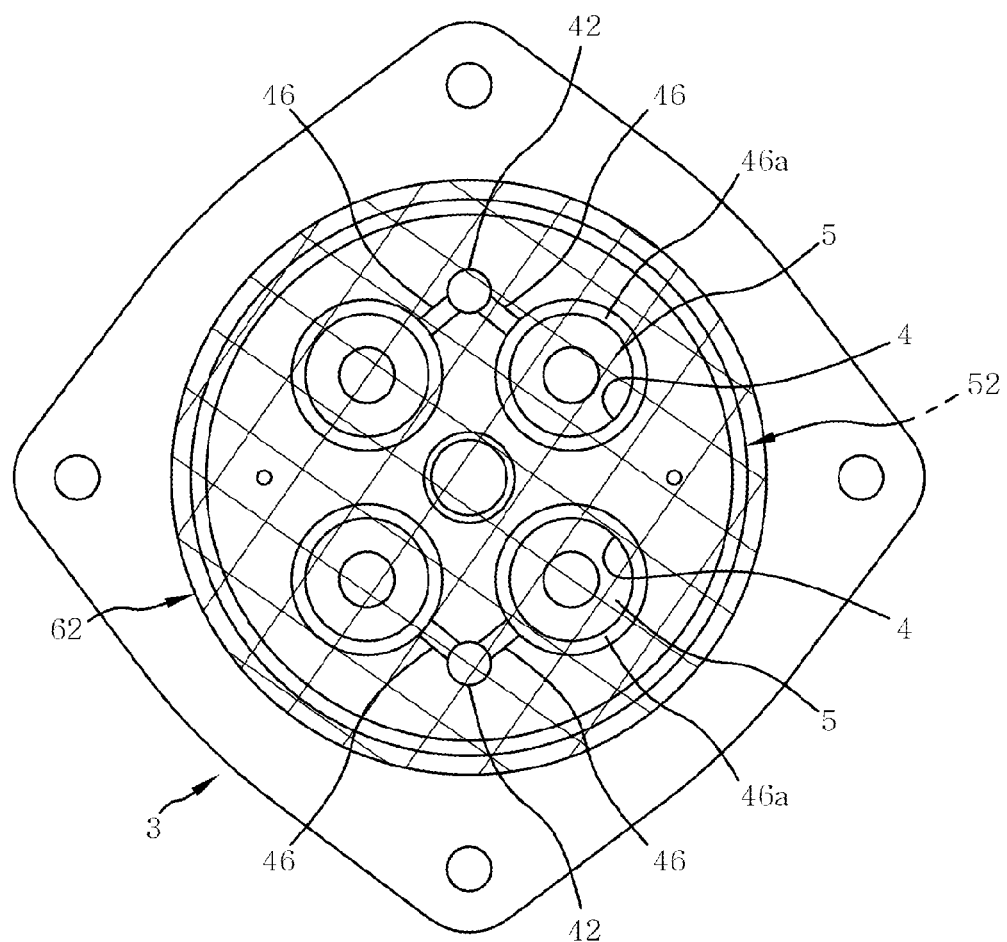
FIG. 12 is a plan view showing the structure of a sixth embodiment of the invention.

In addition, as shown in FIG. 12, the invention may further comprise a shield cap 62 combined to the storage pool 52. The shield cap 62 may cover the upper opening of the storage pool 52, the spool hole 9 and the drain hole 42. Preferably, the screw part is formed at the outer periphery of the storage pool 52, the shield cap 62 includes a closed loop type cap ring member and a shield sheet combined to the cap ring member, and the screw part is formed at the inner periphery of the cap ring member. Accordingly, the screw part of the inner periphery of the cap ring member is combined with the screw part of the outer periphery of the storage pool 52 so that the shield cap 62 may be detachably combined with the storage pool 52. Preferably, the shield sheet is comprised of the flexible material such as wrinkle sheet or rubber sheet, and the stick combining hole is provided at the center of the shield sheet. The joystick lever 1 is airtightly combined in the stick combination hole of the shield sheet so that the seesaw type operation of the joystick lever 1 may not be hindered. By combining the stick combination hole portion of the flexible shield sheet with the outer periphery of the joystick lever 1 by airtight connection means such as band and so on, the shield sheet may be flexibly moved while the joystick lever 1 is operated as seesaw type. Accordingly, the seesaw type operation of the joystick lever 1 may be smoothly performed and the alien material such as dust does not enter through the combination portion between the joystick lever 1 and the shield sheet.

Therefore, because the leak oil storage chamber 32 may be formed in the area of the top surface of the valve body 3 by the shield cap 62 combined to the storage pool 52 and the outer alien material such as dust and so on is not penetrated in the area of the top surface of the valve body 3, the problem may be perfectly solved that the alien material penetrated in the outer boot 20 (the boot covering the connection part of the valve body 3 and the joystick lever 1) is mixed with the leaked operation oil (hydraulic fluid) and the leaked operation oil is contaminated. Although the outer alien material such as dust is penetrated in the outer boot 20, the penetration of the alien material may be prevented by the inner boot 30 and, the penetration of the alien material may be additionally prevented by the shield cap 62 one more time so that the contamination owing to the mixture of the leaked operation oil and the alien material may be prevented perfectly. It is important that firstly the penetration of the alien material may be prevented by the outer boot 20, secondly the penetration of the alien material may be prevented by the inner boot 30, and thirdly the penetration of the alien material may be prevented by the shield cap 62.

In addition, because the shield cap 62 is detachably combined with the gutter type (closed loop type) storage pool 52 protruded over the top surface of the valve body 3 as screw type, the assembly work may be quick and easy, the work for separating the shield cap 62 for maintenance and management is also quick and easy.

On the other hand, in the invention, the subsidiary filter may be detachably combined in the drain hole 42. Here, the subsidiary filter includes a filter mash and a filtering member. The filter mash has oil hole at both ends and screw part at the outer periphery. The filtering member is embedded in the filter mash. Preferably, the screw part provided at the outer periphery of the subsidiary filter is combined with the screw part provided at the inner periphery of the drain hole 42 of the valve body 3 so that the subsidiary filter may be detachably combined in the drain hole 42. If the alien material is mixed with the oil (leaked oil) to flow in the drain hole 42, the subsidiary filter may filter out the alien material. So to speak, the subsidiary filter is more effective for making the clean oil.

What is claimed is:

1. A joystick pilot valve equipped with a structure for preventing oil leakage comprising:
   a valve body provided with a hydraulic fluid chamber and at least one supply port in an inner portion thereof;
   at least one spool installed in the valve body to move between the at least one supply port and the hydraulic fluid chamber and control hydraulic fluid flow;
   a spool hole formed in the valve body in order to make the at least one spool move forward and backward between the at least one supply port and the hydraulic fluid chamber, the spool hole being connected with the hydraulic fluid chamber or disconnected with the hydraulic fluid chamber while the at least one spool moves forward and backward;
   a pushing cam connected to an upper portion of the valve body by a joint;
   a joystick lever connected to the pushing cam to make the at least one spool move in the spool hole forward and backward in order to make the at least one supply port to be connected or disconnected to the hydraulic fluid chamber;
   an outer boot provided at the valve body in order to cover an outer periphery of the valve body, the pushing cam, and the joystick lever;
   an inner boot arranged inside of the outer boot and forming a leak oil storage chamber sealed from an upper outer portion of a guide hole through which the at least one spool moves forward and backward; and
   at least one drain hole formed inside the valve body, one end of the at least one drain hole being connected to the hydraulic fluid chamber and the other end thereof being connected to an area of the leak oil storage chamber.

2. The joystick pilot valve of claim 1, wherein a base end of the inner boot is connected to the valve body and a front end of the inner boot is connected to the joystick lever connected with the pushing cam, and wherein at least one of the pushing cam and part of the push rod upwardly protruded from the guide hole of the valve body is embedded in the leak oil storage chamber.

3. The joystick pilot valve of claim 1, wherein the inner boot is made of a flexible spring tube boot structure having a plurality of corrugations and both ends of the inner boot is connected to the outer periphery of the valve body and the joystick lever, respectively.

4. The joystick pilot valve of claim 1, wherein a check valve is provided in the at least one drain hole, and the check valve prevents hydraulic fluid, which has been leaked toward the leak oil storage chamber and has returned to the hydraulic fluid chamber through the drain hole, from being leaked again toward the hydraulic fluid chamber.

5. The joystick pilot valve of claim 4,
   wherein the check valve comprises:
   a valve seat having an oil passage penetrating the valve seat;
   a check ball positioned between an inner side end of the valve seat and the drain hole;
   an elastic member which pushes the check ball toward the inner side end of the valve seat to make the oil passage closed by the check ball.

6. The joystick pilot valve of claim 4, wherein an inflow guide groove is provided at an upper surface of the valve body.

7. The joystick pilot valve of claim 6, wherein a bottom surface of the inflow guide groove is gradually lowered from the spool hole toward the drain hole.

* * * * *